(12) United States Patent
Hung et al.

(10) Patent No.: US 11,729,016 B2
(45) Date of Patent: Aug. 15, 2023

(54) VEHICLE DATA ANALYSIS DEVICE AND VEHICLE DATA ANALYSIS METHOD

(71) Applicant: INSTITUTE FOR INFORMATION INDUSTRY, Taipei (TW)

(72) Inventors: I-Chou Hung, Taipei (TW); Chih-Min Shih, Taipei (TW); Hsing-Yu Chen, Taipei (TW); Shih-Sian Jhuang, Taipei (TW); Wen-Kai Liu, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 403 days.

(21) Appl. No.: 17/100,960

(22) Filed: Nov. 23, 2020

(65) Prior Publication Data

US 2022/0166643 A1    May 26, 2022

(51) Int. Cl.
*H04L 12/40* (2006.01)
*G07C 5/08* (2006.01)
*G07C 5/00* (2006.01)

(52) U.S. Cl.
CPC .............. *H04L 12/40* (2013.01); *G07C 5/008* (2013.01); *G07C 5/085* (2013.01); *H04L 2012/40215* (2013.01); *H04L 2012/40273* (2013.01)

(58) Field of Classification Search
CPC ........... H04L 12/40; H04L 2012/40215; H04L 2012/40273; G07C 5/008; G07C 5/085
USPC ............................................................. 701/1
See application file for complete search history.

(56) References Cited

U.S. PATENT DOCUMENTS

| | | | |
|---|---|---|---|
| 8,751,098 B2 | 6/2014 | Faus et al. | |
| 11,190,593 B1 * | 11/2021 | Grzegorczyk | ........... G07C 5/00 |
| 11,212,135 B1 * | 12/2021 | Grzegorczyk | ........... H04L 69/22 |
| 11,323,886 B2 * | 5/2022 | Bentley | ............... G08G 5/0069 |
| 11,580,050 B2 * | 2/2023 | Mutter | ............. H04L 12/40006 |
| 11,582,060 B2 * | 2/2023 | Grzegorczyk | ......... H04L 43/16 |
| 2016/0366178 A1 * | 12/2016 | Wesie | ............... H04L 12/40032 |
| 2020/0145433 A1 * | 5/2020 | Gutierrez | ................. G06N 3/08 |
| 2020/0169555 A1 * | 5/2020 | Chung | ................ H04L 63/0876 |
| 2021/0029148 A1 * | 1/2021 | Wee | ......................... H04L 67/34 |
| 2021/0203682 A1 * | 7/2021 | Bajpai | ..................... G06F 21/55 |
| 2022/0060351 A1 * | 2/2022 | Grzegorczyk | ......... H04L 12/40 |
| 2022/0060353 A1 * | 2/2022 | Mutter | ............. H04L 12/40013 |
| 2022/0060543 A1 * | 2/2022 | Grzegorczyk | ......... H04L 12/40 |
| 2022/0156367 A1 * | 5/2022 | Stein | ....................... G06F 21/85 |
| 2022/0164248 A1 * | 5/2022 | Stein | ...................... G06N 3/045 |

FOREIGN PATENT DOCUMENTS

| | | | | |
|---|---|---|---|---|
| EP | 3316524 A1 * | 5/2018 | ............. | H04L 12/40 |
| WO | WO-2019227076 A1 * | 11/2019 | ....... | H04L 12/40013 |

OTHER PUBLICATIONS

Mohamad et al., "Vehicle Sensors Programming Based on Controller Area Network (CAN) Bus Using Canoe," 2019, Publisher: 2019.*

(Continued)

*Primary Examiner* — Tuan C To
(74) *Attorney, Agent, or Firm* — CKC & Partners Co., LLC

(57) ABSTRACT

A vehicle data analysis device and a vehicle data analysis method thereof are provided. The vehicle data analysis device receives a sensing data and a controller area network (CAN) message, and performs a similarity comparison on the sensing data and a plurality of bytes of a data field of the CAN message to determine whether the CAN message is a target CAN message corresponding to the sensing data.

14 Claims, 10 Drawing Sheets

(56) References Cited

OTHER PUBLICATIONS

J. Rivera et al., "A Fuzzy Message Priority Arbitration Approach for Sensor Networks," 2007, Publisher: IEEE.*
The office action of the corresponding Taiwanese application No. TW 110102007 dated Jul. 30, 2021.

* cited by examiner

US 11,729,016 B2

VEHICLE DATA ANALYSIS DEVICE AND VEHICLE DATA ANALYSIS METHOD

BACKGROUND

Field of Invention

The present disclosure relates to a vehicle data analysis device and a vehicle data analysis method thereof. More particularly, the present disclosure relates to derive a data structure of an electronic control unit by comparing the data generated by a sensor and the data generated by the ECU.

Description of Related Art

With the rapid development of science and technology, different kinds of vehicles are equipped with electronic systems to control various electronic control units (ECUs) mounted on the vehicles and the components that combined with the ECUs so as to monitor and detect different part of the vehicle. Controller Area Network (CAN) is a bus standard widely used in vehicles, allowing the ECUs mounted on the vehicle to communicate with each other through the CAN bus.

Moreover, benefited from the maturity of mobile communication technology, telematics communication has become one of the mainstream of the current industry development. Therefore, more and more vehicles will install ECUs with mobile communication functions. However, the meaning of the data field of the CAN message transmitted by the ECU varies depending on the ECU developer and car manufacturer. Therefore, without the data about the ECU provided by the manufacturer, it is difficult to understand the meaning of each CAN message and impossible to monitor and manage the vehicle based on the CAN message.

Accordingly, how to provide a data analysis mechanism for unknown CAN messages to obtain meaningful content in the data field of the CAN messages is an urgent need in the art.

SUMMARY

An objective of the present disclosure is to provide a data analysis mechanism which compares the data, generated by a sensor mounted in a vehicle, and the messages, generated by multiple electronic control units (ECUs), to derive which bytes of a data field of the message is/are used for carrying data. Accordingly, important information of the vehicle can be understood through the data analysis mechanism, which is applicable to different vehicle or ECUs, of the present disclosure so as to collect data generated by the each of the ECUs in the future.

The present disclosure provides a vehicle data analysis device which comprises a transceiver and a processor. The processor electrically connected to the transceiver, and is configured to execute the following operations: receiving a sensing data and a controller area network (CAN) message via the transceiver; and performing a similarity comparison on the sensing data and a plurality of bytes of a data field of the CAN message to determine whether the CAN message is a target CAN message corresponding to the sensing data.

In addition, the present disclosure further provides a vehicle data analysis method for a vehicle data analysis device. The vehicle data analysis device comprises a transceiver and a processor. The vehicle data analysis method is executed by the processor and comprises the following steps: receiving a sensing data and a controller area network (CAN) message via the transceiver; and performing a similarity comparison on the sensing data and a plurality of bytes of a data field of the CAN message to determine whether the CAN message is a target CAN message corresponding to the sensing data.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
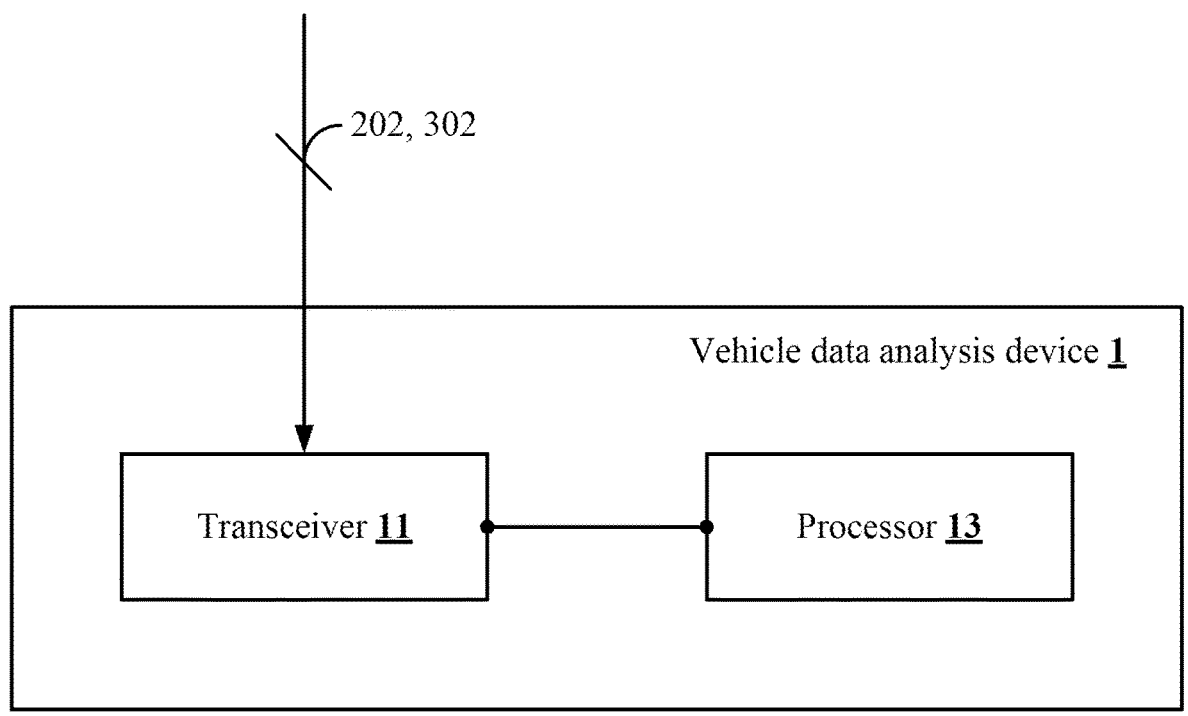
FIG. 1 is a schematic view of a vehicle data analysis device 1 according to the present disclosure.

Reference will now be made in detail to the present embodiments of the invention, examples of which are illustrated in the accompanying drawings, and are not intended to limit the present invention to any specific environment, applications or particular implementations described in these embodiments. Therefore, description of these embodiments is only for purpose of illustration rather than to limit the present invention. Wherever possible, the same reference numbers are used in the drawings and the description to refer to the same or like parts. It shall be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 2:
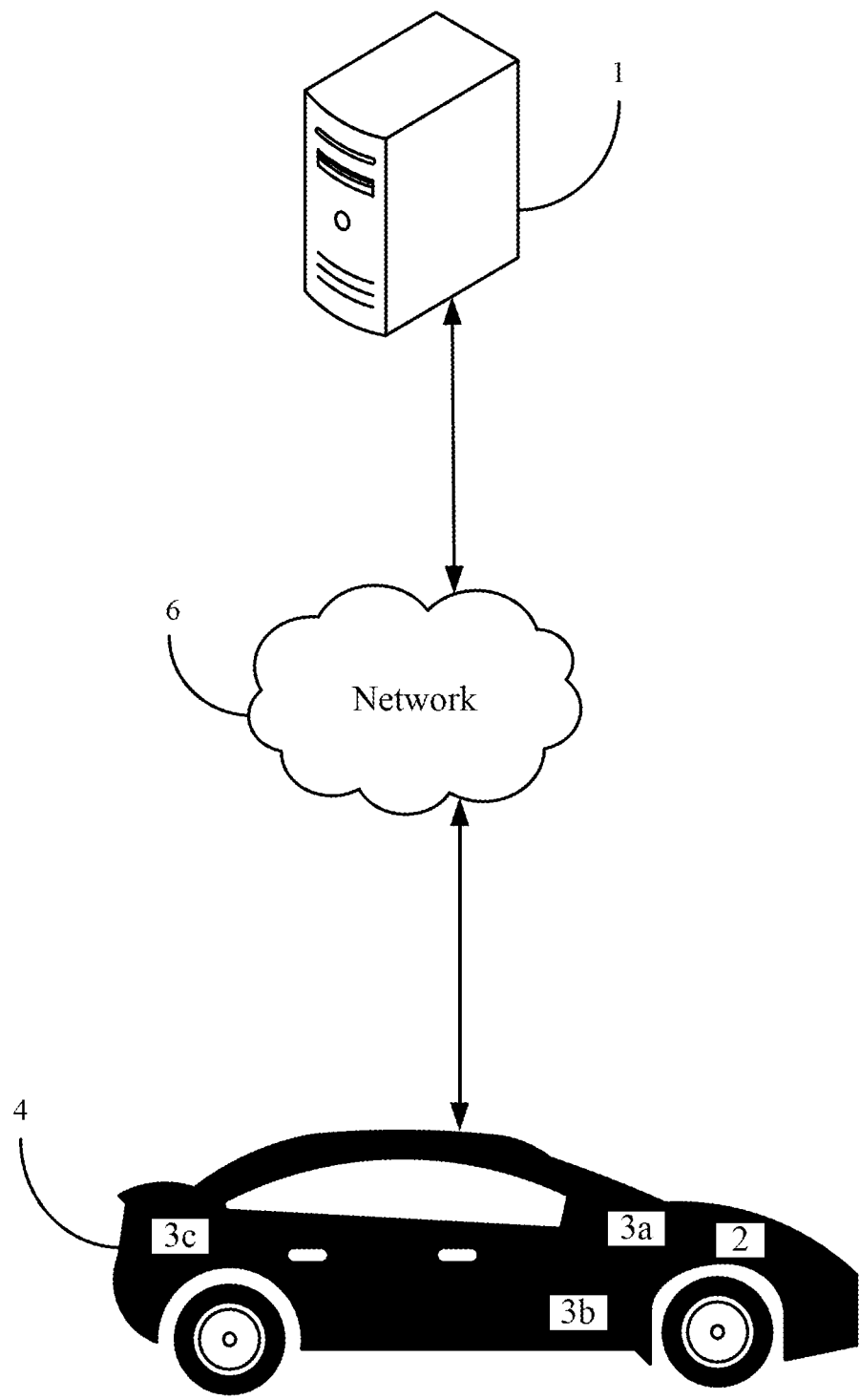
FIG. 2 is an implementation of telematics according to the present disclosure.

A first embodiment of the present invention is as shown in FIG. 1 to FIG. 5. FIG. 1 is a schematic view of a vehicle data analysis device 1 according to the present disclosure, and FIG. 2 is an implementation of telematics according to the present disclosure. The vehicle data analysis device 1 includes the transceiver 11 and the processor 13. The processor 13 is electrically connected to the transceiver 11.

The processor 13 receives a sensing data 202 and a controller area network (CAN) message 302 via the transceiver 11, and performs a similarity comparison on the sensing data 202 and a plurality of bytes of a data field of the CAN message 302 to determine whether the CAN message is a target CAN message corresponding to the sensing data.

Specifically, reference is made to FIG. 2, the sensing data 202 is generated by a sensor 2 and the CAN message 302 is generated by an electronic control unit (ECU) (i.e., one of the ECUs 3a, 3b, and 3c). To simplify the description, only ECUs 3a, 3b and 3c are depicted in FIG. 2. However, it shall be appreciated that, the number of the ECUs is not intended to limit the present invention. The sensor 2 may be a Global Navigation Satellite System (GNSS) module, an Inertial Measurement Unit (IMU) module, etc. for sensing different part of the vehicle 4. The sensor 2 and the ECUs 3a, 3b, and 3c are mounted in the vehicle 4.

Figure 3:
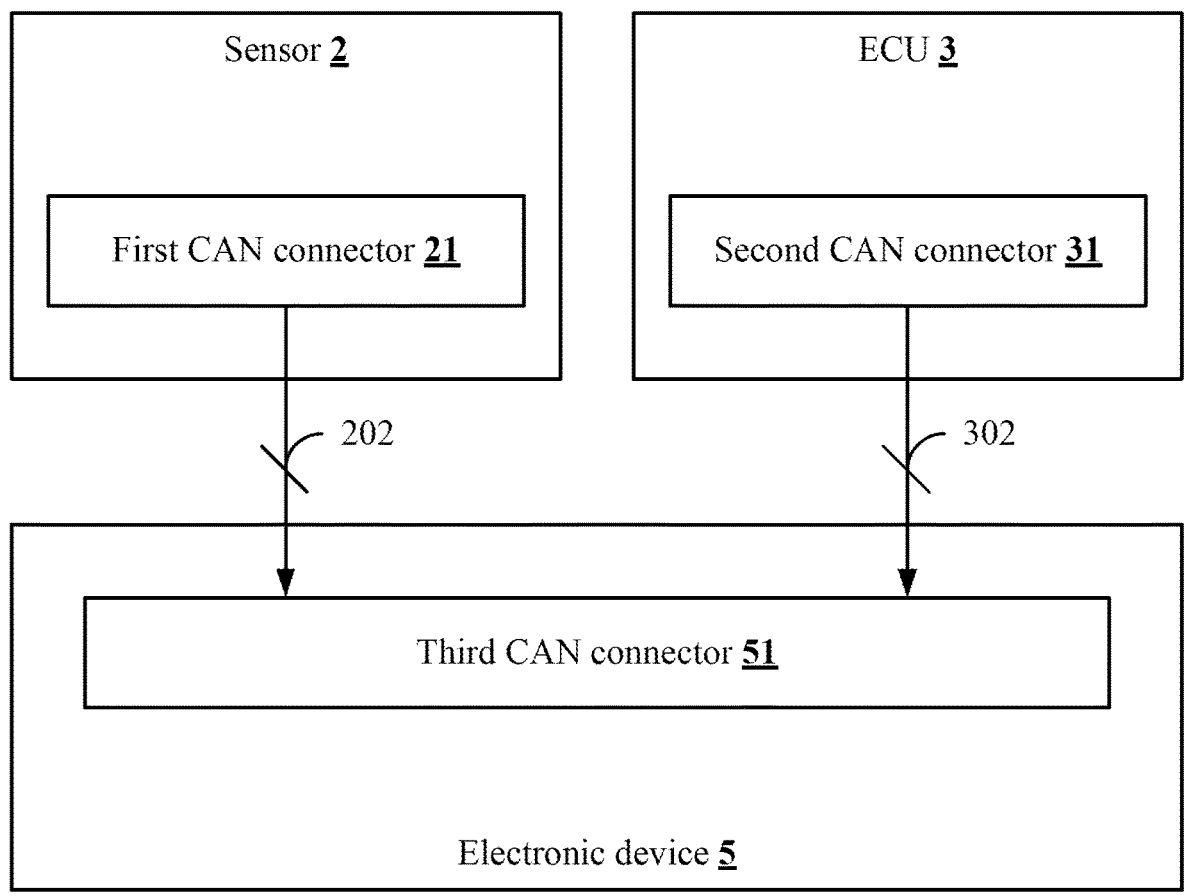
FIG. 3 is a schematic view of a sensor, an electronic control unit, and an electronic device according to the present disclosure.

As shown in FIG. 3, the sensor 2 includes a first CAN connector 21, the ECU 3 includes a second CAN connector 31, and an electronic device 5 includes a third CAN connector 51. Both of the first CAN connector 21 and the second CAN connector 31 are connected to the third CAN connector 51. All of the first CAN connector 21, the second CAN connector 31, and the third CAN connector 51 have a CAN bus for transmitting data and messages.

Figure 4:
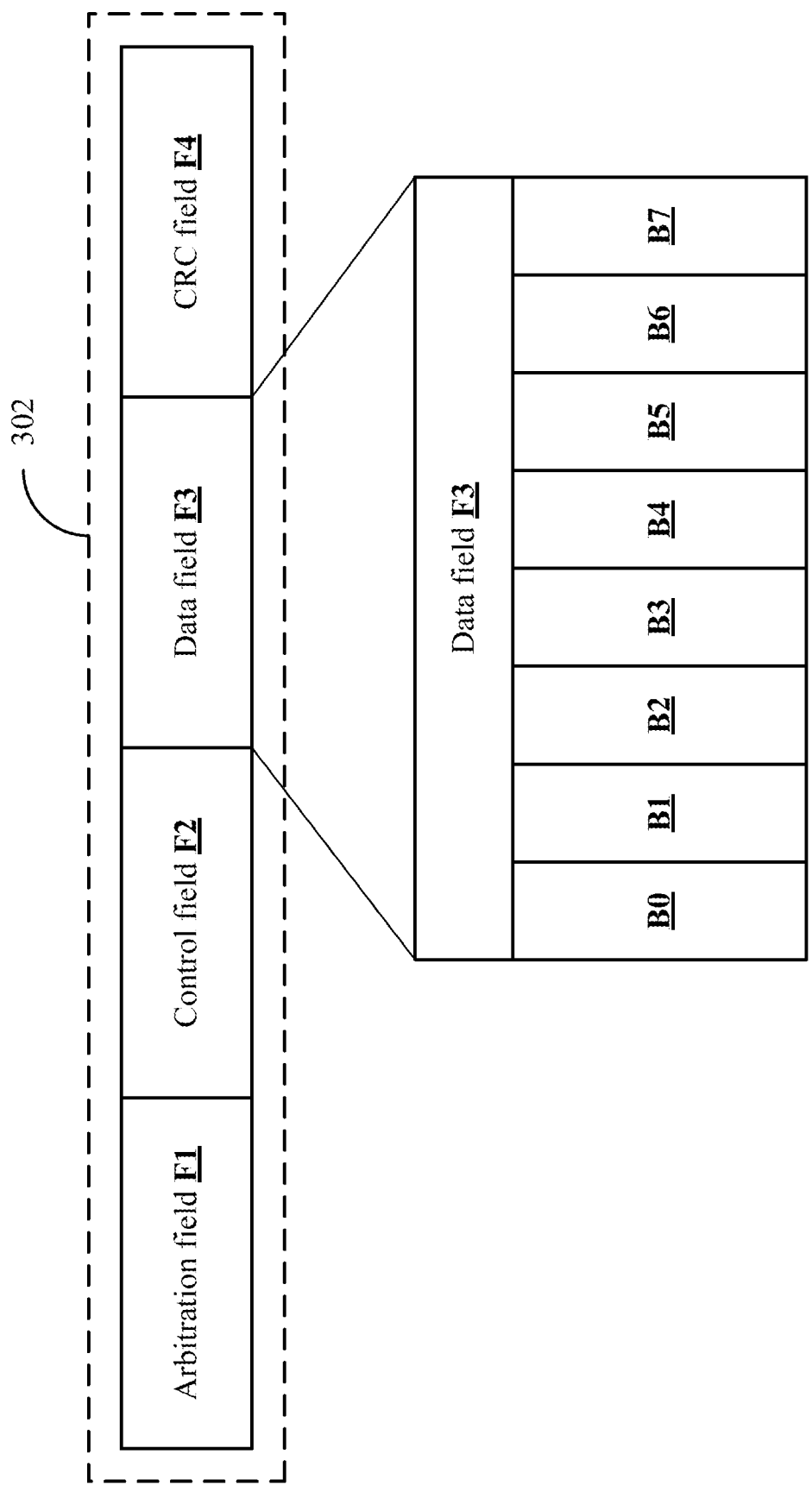
FIG. 4 is a schematic view of a CAN message and a data field according to the present disclosure.

As shown in FIG. 4, the CAN message 302 at least includes an arbitration field F1, a control field F2, a data field F3, and a cyclic redundancy check (CRC) field F4. The arbitration field F1 carries an identifier of the ECU 3 that transmits the CAN message 302, and the data field F3 carries data related to a part of the vehicle 4. The data field F3 includes a plurality of bytes B0~B7 for carrying data.

If the information of the ECU 3 is unknown, the processor 13 is not able to decode the CAN message 302. However, since the sensing data 202 and the CAN message 302 are related to the vehicle 4, the processor 13 of the present disclosure can derive which byte of the data field F3 is used for carrying data by performing a similarity comparison on the sensing data 202 and a plurality of bytes of a data field of the CAN message 302 to determine whether the CAN message is a target CAN message corresponding to the sensing data.

For example, the vehicle data analysis device 1 is a server, and the sensor 2 is the GNSS module. After the vehicle 4 is running in a time period, the sensor 2 records distance and time, calculates the speed of the vehicle 4, and transmits the sensing data 202 related to the speed to the electronic device 5. The ECU 3 retrieves the speed of the vehicle 4, and transmits the CAN message 302 related to the speed to the electronic device 5.

Then, the electronic device 5 transmits the sensing data 202 and the CAN message 302 to the vehicle data analysis device 1 through a network 6 (e.g., mobile communication network, Wi-Fi, etc.). After receiving the sensing data 202 and the CAN message 302, the processor 13 of the vehicle data analysis device 1 performs the similarity comparison by calculating a similarity value between the sensing data and the CAN message.

The similarity comparison may be Pearson's correlation coefficient, Cosine similarity, Longest Common Sub-Sequence (LCSS), Euclidean Distance, One-way distance, and Frechet Distance, but not limited thereto. It shall be noted that, the threshold of the similarity value will be different based on the similarity comparison.

When the similarity value is greater than or equal to a threshold, the processor 13 determines that the CAN message 302 is the target CAN corresponding to the sensing data 202. Once the meaning of the CAN message is determined, the processor 13 can further monitor and manage the vehicle 4 according to the sensing data and the related target CAN message.

Figure 5:
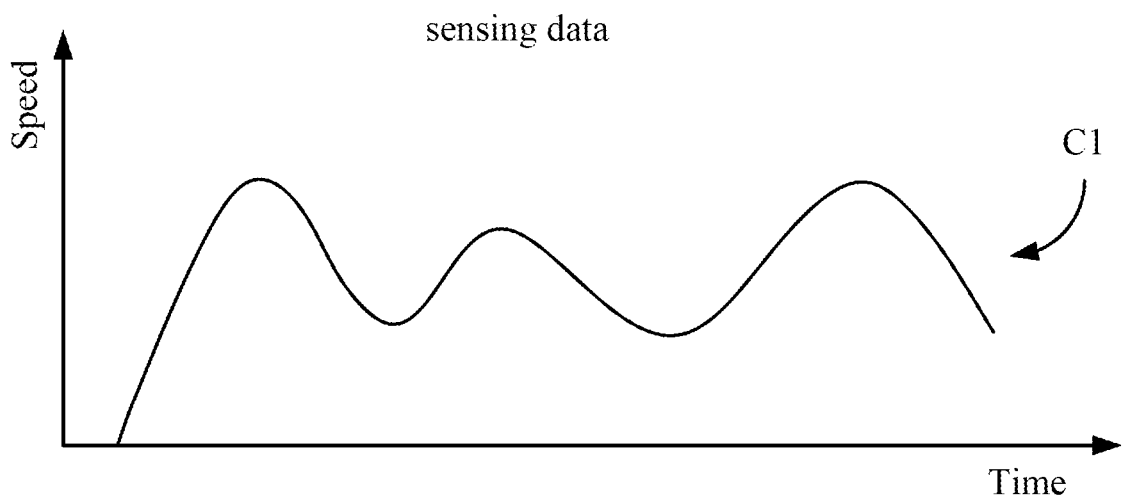
FIG. 5 depicts curves corresponding to the sensing data and the CAN message respectively according to the present disclosure.
Figure 5:
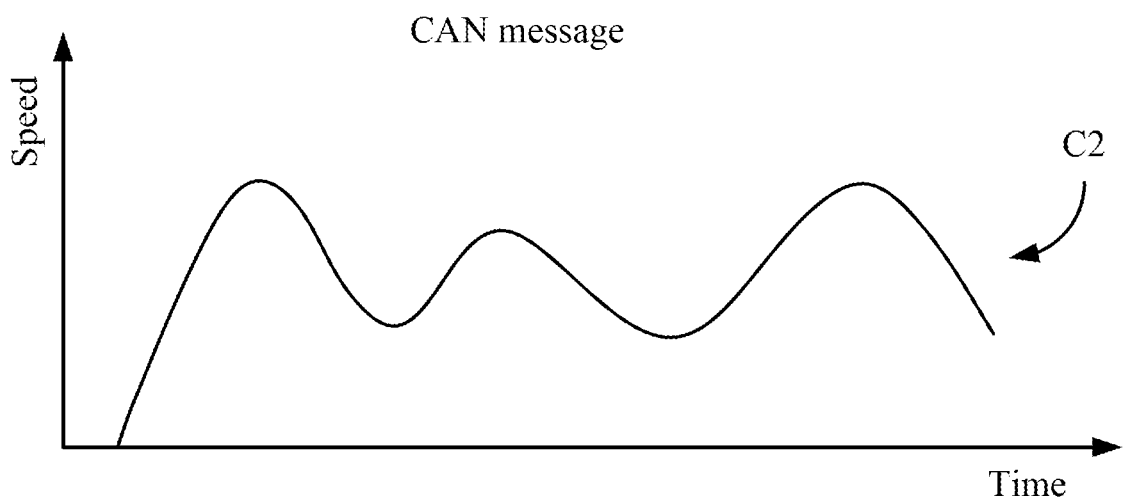

In other embodiments, before performing the similarity comparison, the processor 13 may transform the sensing data 202 into a character curve C1, transform the CAN message 302 into a character curve C2, as shown in FIG. 5.

In other embodiments, the sensor 2 generates and transmits a plurality of initial sensing data to the electronic device 5. The ECU 3 generates and transmits a plurality of initial CAN messages to the electronic device 5. After the processor 13 receives the initial CAN messages via the transceiver 11, the processor 13 filters the initial CAN messages with peak value in the data field, determines whether the data field of the rest of the initial CAN messages changes, and selects at least one of the rest of the initial CAN messages as the CAN message for analyzing the meaning of the CAN message. That is to say, the data field of the selected at least one of the initial CAN message changes.

A second embodiment of the present invention is as shown in FIG. 6 to FIG. 13. The second embodiment is an extension of the first embodiment. In this embodiment, the similarity comparison is performed on the bytes and the sensing data.

In detail, the processor 13 of the vehicle data analysis device 1 performs a byte combination process on the bytes of the data field of the CAN message to generate a plurality of combination data, calculates the similarity value between the sensing data and each of the combination data. When a target similarity value of the similarity values is greater than or equal to a threshold, the processor 13 determines that the CAN message is the target CAN corresponding to the sensing data. The target similarity value is the greatest similarity value among the similarity values.

For example, the data field F3 includes eight bytes B0~B7, when the processor 13 performs a byte combination process on the bytes B0~B7 of the data field F3 of the CAN message, the processor 13 combined different number of bytes to generate multiple combination data.

Figure 6:
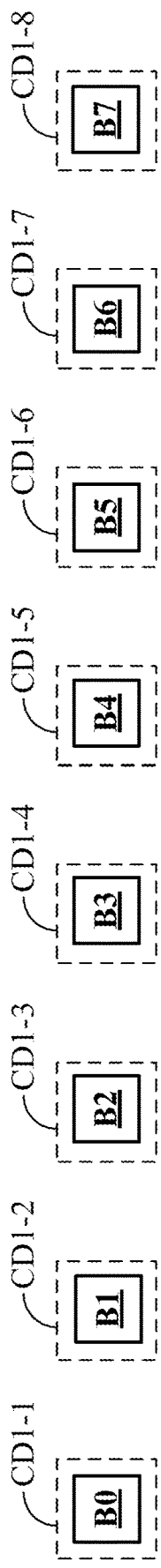
FIG. 6 depicts the combination data CB1-1~CB1-8 according to the present disclosure.
Figure 7:
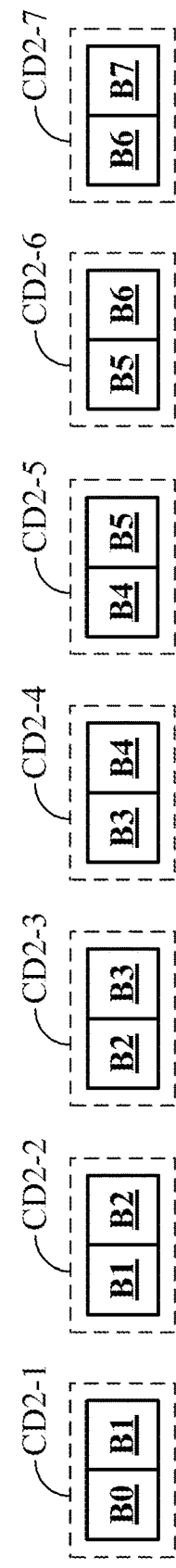
FIG. 7 depicts the combination data CB2-1~CB2-7 according to the present disclosure.

When the processor 13 takes each of the bytes B0~B7 as a combination data, then each of the combination data CB1-1~CB1-8 includes only one byte, as shown in FIG. 6. When the processor 13 takes two of the bytes B0~B7 as a combination data, each of the combination data CB2-1~CB2-7 includes two bytes, as shown in FIG. 7.

Figure 8:
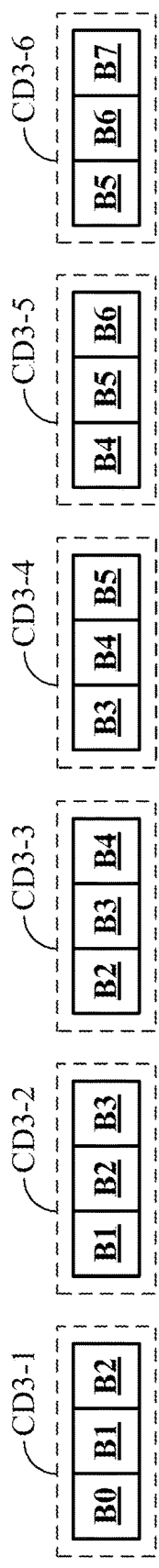
FIG. 8 depicts the combination data CB3-1~CB3-6 according to the present disclosure.
Figure 9:
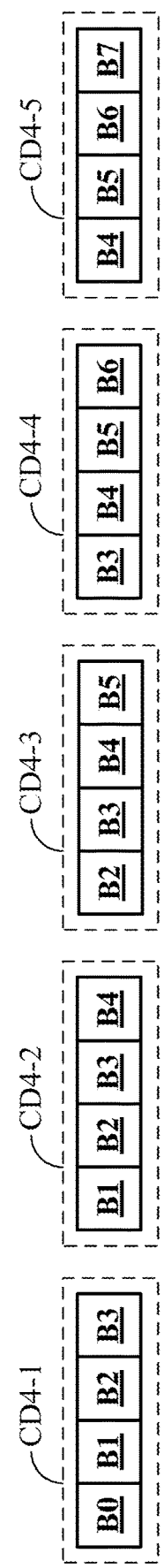
FIG. 9 depicts the combination data CB4-1~CB4-5 according to the present disclosure.

When the processor 13 takes three of the bytes B0~B7 as a combination data, then each of the combination data CB3-1~CB3-6 includes three bytes, as shown in FIG. 8. When the processor 13 takes four of the bytes B0~B7 as a combination data, each of the combination data CB4-1~CB4-5 includes four bytes, as shown in FIG. 9.

Figure 10:
FIG. 10 depicts the combination data CB5-1~CB5-4 according to the present disclosure.
Figure 11:
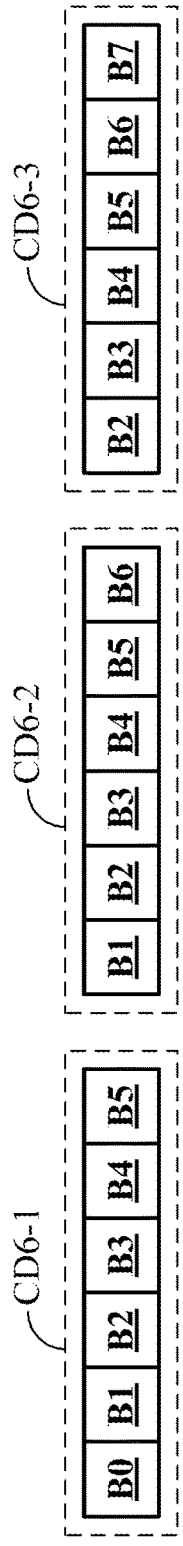
FIG. 11 depicts the combination data CB6-1~CB6-3 according to the present disclosure.

When the processor 13 takes five of the bytes B0~B7 as a combination data, then each of the combination data CB5-1~CB5-4 includes five bytes, as shown in FIG. 10. When the processor 13 takes six of the bytes B0~B7 as a combination data, each of the combination data CB6-1~CB6-3 includes six bytes, as shown in FIG. 11.

Figure 12:
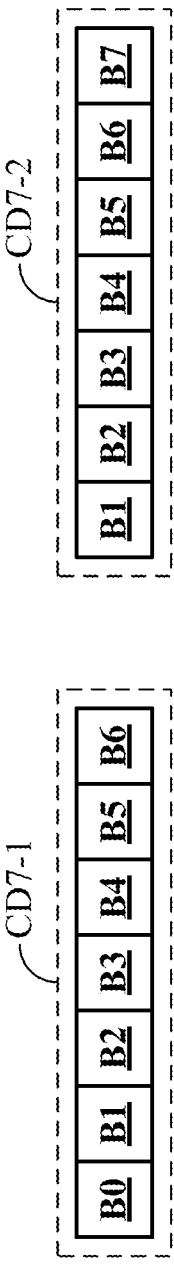
FIG. 12 depicts the combination data CB7-1~CB7-2 according to the present disclosure.
Figure 13:
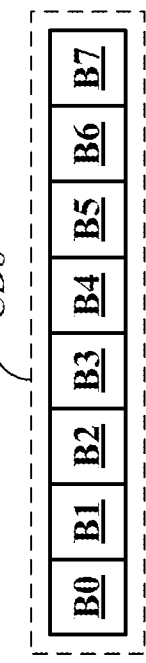
FIG. 13 depicts the combination data CB8 according to the present disclosure.

When the processor 13 takes seven of the bytes B0~B7 as a combination data, then each of the combination data CB7-1~CB7-2 includes seven bytes, as shown in FIG. 12. When the processor 13 takes eight of the bytes B0~B7 as a combination data, i.e., the processor 13 takes all of the bytes as a combination data, the combination data CB8 includes eight bytes, as shown in FIG. 13.

After finishing the byte combination process, the processor 13 calculates the similarity value between the sensing data and each of the combination data CB1-1~CB1-8, CB2-1~CB2-7, CB3-1~CB3-6, CB4-1~CB4-5, CB5-1~CB5-4, CB6-1~CB6-3, CB7-1~CB7-2, CB8. If the greatest similarity value is greater than or equal to the threshold, the processor 13 determines that the CAN message is the target CAN message corresponding to the sensing data, and derives a data structure corresponding to the ECU according to the combination data corresponding to the target similarity value.

Figure 14:
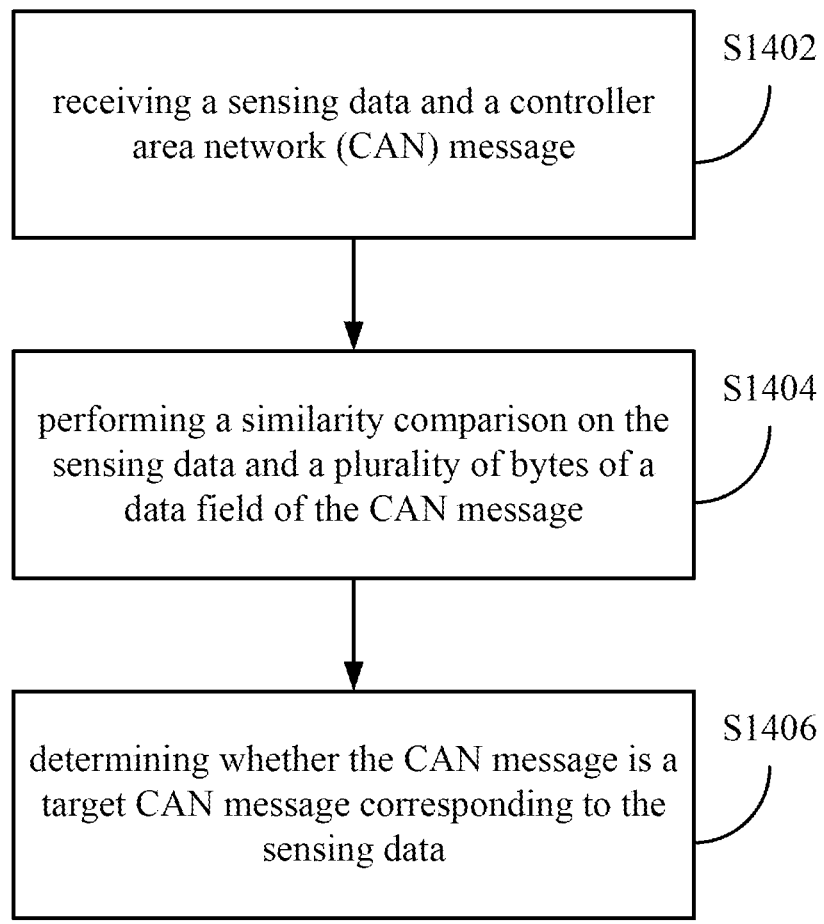
FIG. 14 is a flowchart diagram of the vehicle data analysis method according to the present disclosure.

A third embodiment of the present invention describes a vehicle data analysis method, and a flowchart diagram thereof is as shown in FIG. 14. The vehicle data analysis method is adapted for use in a vehicle data analysis device (e.g., the vehicle data analysis device 1 of the aforesaid embodiments) for a telematics system. The vehicle data analysis device includes a transceiver and a processor. The vehicle data analysis method is executed by the processor and includes the following steps.

First, in step S1402, receiving a sensing data and a controller area network (CAN) message. In step S1404, performing a similarity comparison on the sensing data and a plurality of bytes of a data field of the CAN message. In step S1406, determining whether the CAN message is a target CAN message corresponding to the sensing data.

In other embodiments, when performing the similarity comparison, calculates a similarity value between the sensing data and the CAN message, and determines that the CAN message is the target CAN corresponding to the sensing data when the similarity value is greater than or equal to a threshold.

In other embodiments, receives a plurality of initial CAN messages via the transceiver, determines whether a data field of each of the initial CAN messages changes, selects at least one of the initial CAN messages as the CAN message. The data field of the selected at least one of the initial CAN message changes.

In other embodiments, when performing the similarity comparison, performs a byte combination process on the bytes of the data field of the CAN message to generate a plurality of combination data, calculates a similarity value between the sensing data and each of the combination data, and determines that the CAN message is the target CAN corresponding to the sensing data when a target similarity value of the similarity values is greater than or equal to a threshold. In one embodiment, the target similarity value is the greatest similarity value among the similarity values.

In other embodiments, the CAN message is generated by an electronic control unit (ECU), the vehicle data analysis method further derives a data structure corresponding to the ECU according to the combination data corresponding to the target similarity value.

In other embodiments, the sensing data is generated by a sensor which comprises a first CAN connector, the CAN message is generated by an electronic control unit (ECU) which comprises a second CAN connector, the sensor transmits the sensing data to an electronic device via the first CAN connector, the ECU transmits the CAN message to the electronic device via the second CAN connector, and the processor receives the sensing data and the CAN message from the electronic device.

In other embodiments, the sensor and the ECU are mounted in a vehicle, and the vehicle data analysis method further monitors and manages the vehicle according to the sensing data and the target CAN message.

In addition to the aforesaid steps, the cooperative operation controlling method of the present invention can also execute all the operations described in all of the aforesaid embodiments and have all the corresponding functions, and how this embodiment executes these operations and have these functions shall be readily appreciated by those of ordinary skill in the art based on all of the aforesaid embodiments, and thus will not be further described herein.

According to the above descriptions, data analysis mechanism of the present disclosure compares the data, generated by a sensor mounted in a vehicle, and the messages, generated by multiple electronic control units (ECUs), to derive which bytes of a data field of the message is/are used for carrying data. Accordingly, important information of the vehicle can be understood through the data analysis mechanism, which is applicable to different vehicle or ECUs, of the present disclosure so as to collect data generated by the each of the ECUs in the future.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A vehicle data analysis device, comprising:
a transceiver; and
a processor electrically connected to the transceiver, and being configured to execute operations comprising:
receiving a sensing data and a controller area network (CAN) message via the transceiver; and
performing a similarity comparison on the sensing data and a plurality of bytes of a data field of the CAN message to determine whether the CAN message is a target CAN message corresponding to the sensing data, wherein the sensing data is generated by a sensor which comprises a first CAN connector, the CAN message is generated by an electronic control unit (ECU) which comprises a second CAN connector, the sensor transmits the sensing data to an electronic device via the first CAN connector, the ECU transmits the CAN message to the electronic device via the second CAN connector, and the processor receives the sensing data and the CAN message from the electronic device.

2. The vehicle data analysis device of claim 1, wherein when performing the similarity comparison, the processor is further configured to execute operations comprising:
calculating a similarity value between the sensing data and the CAN message; and
determining that the CAN message is the target CAN corresponding to the sensing data when the similarity value is greater than or equal to a threshold.

3. The vehicle data analysis device of claim 1, wherein the processor is further configured to execute operations comprising:
receiving a plurality of initial CAN messages via the transceiver;
determining whether a data field of each of the initial CAN messages changes; and selecting at least one of the initial CAN messages as the CAN message;

wherein the data field of the selected at least one of the initial CAN message changes.

4. The vehicle data analysis device of claim 1, wherein when performing the similarity comparison, the processor is further configured to execute operations comprising:

performing a byte combination process on the bytes of the data field of the CAN message to generate a plurality of combination data;

calculating a similarity value between the sensing data and each of the combination data; and determining that the CAN message is the target CAN corresponding to the sensing data when a target similarity value of the similarity values is greater than or equal to a threshold.

5. The vehicle data analysis device of claim 4, wherein the target similarity value is the greatest similarity value among the similarity values.

6. The vehicle data analysis device of claim 4, wherein the processor is further configured to execute operations comprising:

deriving a data structure corresponding to the ECU according to the combination data corresponding to the target similarity value.

7. The vehicle data analysis device of claim 1, wherein the sensor and the ECU are mounted in a vehicle, and the processor is further configured to execute operations comprising:

monitoring and managing the vehicle according to the sensing data and the target CAN message.

8. A vehicle data analysis method for a vehicle data analysis device, the vehicle data analysis device comprising a transceiver and a processor, the vehicle data analysis method being executed by the processor and comprising the following steps:

receiving a sensing data and a controller area network (CAN) message via the transceiver;

performing a similarity comparison on the sensing data and a plurality of bytes of a data field of the CAN message; and determining whether the CAN message is a target CAN message corresponding to the sensing data, wherein the sensing data is generated by a sensor which comprises a first CAN connector, the CAN message is generated by an electronic control unit (ECU) which comprises a second CAN connector, the sensor transmits the sensing data to an electronic device via the first CAN connector, the ECU transmits the CAN message to the electronic device via the second CAN connector, and the processor receives the sensing data and the CAN message from the electronic device.

9. The vehicle data analysis method of claim 8, wherein when performing the similarity comparison, the vehicle data analysis method further comprises the following steps:

calculating a similarity value between the sensing data and the CAN message; and determining that the CAN message is the target CAN corresponding to the sensing data when the similarity value is greater than or equal to a threshold.

10. The vehicle data analysis method of claim 8, further comprising the followings steps:

receiving a plurality of initial CAN messages via the transceiver;

determining whether a data field of each of the initial CAN messages changes; and selecting at least one of the initial CAN messages as the CAN message;

wherein the data field of the selected at least one of the initial CAN message changes.

11. The vehicle data analysis method of claim 8, wherein when performing the similarity comparison, the vehicle data analysis method further comprises the following steps:

performing a byte combination process on the bytes of the data field of the CAN message to generate a plurality of combination data;

calculating a similarity value between the sensing data and each of the combination data; and determining that the CAN message is the target CAN corresponding to the sensing data when a target similarity value of the similarity values is greater than or equal to a threshold.

12. The vehicle data analysis method of claim 11, wherein the target similarity value is the greatest similarity value among the similarity values.

13. The vehicle data analysis method of claim 11, wherein the vehicle data analysis method further comprises the following step:

deriving a data structure corresponding to the ECU according to the combination data corresponding to the target similarity value.

14. The vehicle data analysis method of claim 8, wherein the sensor and the ECU are mounted in a vehicle, and the vehicle data analysis method further comprises the following step:

monitoring and managing the vehicle according to the sensing data and the target CAN message.

* * * * *